(12) United States Patent
Cohen

(10) Patent No.: US 8,418,732 B2
(45) Date of Patent: Apr. 16, 2013

(54) BLENDING COMPRESSED GASES

(75) Inventor: Joseph Perry Cohen, Bethlehem, PA (US)

(73) Assignee: Air Products and Chemicals, Inc., Allentown, PA (US)

(*) Notice: Subject to any disclaimer, the term of this patent is extended or adjusted under 35 U.S.C. 154(b) by 46 days.

(21) Appl. No.: 13/177,030

(22) Filed: Jul. 6, 2011

(65) Prior Publication Data
US 2013/0008557 A1   Jan. 10, 2013

(51) Int. Cl.
 *B65B 1/04*   (2006.01)
(52) U.S. Cl.
 USPC .............. 141/9; 141/107; 141/94; 141/98; 141/197
(58) Field of Classification Search .............. 141/9, 100, 141/104, 105, 107, 94, 98, 197
 See application file for complete search history.

(56) References Cited

U.S. PATENT DOCUMENTS

| 5,139,002 A | 8/1992 | Lynch et al. |
| 5,771,948 A | 6/1998 | Kountz et al. |
| 5,975,353 A * | 11/1999 | Finlayson ...................... 222/26 |
| 5,979,705 A | 11/1999 | Kaehler et al. |
| 6,223,788 B1 | 5/2001 | Taylor |
| 6,786,245 B1 * | 9/2004 | Eichelberger et al. ............ 141/4 |
| 6,810,925 B2 | 11/2004 | Graham et al. |
| 7,032,629 B1 | 4/2006 | Mattingly et al. |
| 7,168,464 B2 | 1/2007 | Diggins |
| 7,328,726 B2 * | 2/2008 | Cohen et al. ...................... 141/9 |
| 7,740,031 B2 * | 6/2010 | Egan et al. ................... 141/105 |
| 2007/0079891 A1 | 4/2007 | Farese et al. |
| 2007/0079892 A1 | 4/2007 | Cohen et al. |
| 2011/0056570 A1 * | 3/2011 | Bayliff et al. .................. 137/14 |

* cited by examiner

*Primary Examiner* — Gregory Huson
*Assistant Examiner* — Jason K Niesz
(74) *Attorney, Agent, or Firm* — Bryan C. Hoke, Jr.

(57) ABSTRACT

Compressed gas delivery system and process for use thereof wherein compressed gases are withdrawn from compressed gas storage vessels, passed through pressure regulated flow control valves and critical flow venturis to control the mass flow rates of the compressed gases forming the blend of the compressed gases prior to dispensing the blend.

7 Claims, 3 Drawing Sheets

BLENDING COMPRESSED GASES

BACKGROUND

Cleaner burning fuels are desired to reduce the impact of fossil fuel combustion on the Earth's environment. One approach reducing the impact of combustion is using hydrogen as a fuel. When hydrogen is burned, the resulting product of combustion is water.

Hydrogen can be used as the fuel in internal combustion engines. For example, Air Products and Chemicals, Inc. operates a hydrogen-powered Ford E-450 shuttle bus on the Trexlertown, Pa. campus.

Another option is to burn compressed natural gas (CNG). And yet another option is to burn a mixture of hydrogen and compressed natural gas (HCNG). The town of Hempstead, N.Y. has a project to demonstrate the generation of hydrogen and a blend of hydrogen and natural gas, and the use of these fuels in motor vehicles (http://www.tohcleanenergyproject.org).

Industry desires to blend compressed gases from multiple sources, the blends having specified compositions.

Industry desires to provide accurate blending of compressed gases where the resulting composition of the compressed gas blend is tolerant of variations in the supply pressures of the compressed gas sources, and tolerant of variations of system pressures during delivery of the compressed gases.

BRIEF SUMMARY

The present invention relates to an apparatus and process for delivering a blend of two or more compressed gases to a receiving vessel.

There are several aspects of the process as outlined below.

Aspect #1. An apparatus for delivering a blend of two or more compressed gases to a receiving vessel, the apparatus comprising:
- (i) one or more compressed gas storage vessels containing a first compressed gas;
- (ii) a first pressure regulated flow control valve in downstream fluid flow communication with the one or more compressed gas storage vessels containing the first compressed gas;
- (iii) a first critical flow venturi in downstream fluid flow communication with the first pressure regulated flow control valve;
- (iv) one or more compressed gas storage vessels containing a second compressed gas;
- (v) a second pressure regulated flow control valve in downstream fluid flow communication with the one or more compressed gas storage vessels containing the second compressed gas;
- (vi) a second critical flow venturi in downstream fluid flow communication with the second pressure regulated flow control valve; and
- (vii) a mixing junction in downstream fluid flow communication with the first critical flow venturi and also in downstream fluid flow communication with the second critical flow venturi for receiving the first compressed gas and the second compressed gas, the mixing junction in upstream fluid flow communication with the receiving vessel;

wherein the first compressed gas and the second compressed gas have different compositions.

Aspect #2. The apparatus according to aspect #1 further comprising:
- a first flow meter operatively disposed between the one or more compressed gas storage vessels containing the first compressed gas and the receiving vessel for measuring the flow rate of the first compressed gas independent of the flow rate of the second compressed gas; and
- a second flow meter operatively disposed between the one or more compressed gas storage vessels containing the second compressed gas and the receiving vessel for measuring the flow rate of the second compressed gas independent of the flow rate of the first compressed gas.

Aspect #3. The apparatus according to aspect #2 further comprising:
- a first current-to-pressure transducer operatively connected to the first pressure regulated flow control valve for adjusting the first pressure regulated flow control valve;
- a second current-to-pressure transducer operatively connected to the second pressure regulated flow control valve for adjusting the second pressure regulated flow control valve;
- a controller operatively connected to the first flow meter for receiving a signal representing the flow rate of the first compressed gas, the controller operatively connected to the second flow meter for receiving another signal representing the flow rate of the second compressed gas, the controller operatively connected to the first current-to-pressure transducer and the second current-to-pressure transducer for sending a control signals to the first current-to-pressure transducer and the second current-to-pressure transducer.

Aspect #4. A process for delivering the blend of two or more compressed gases to the receiving vessel using the apparatus of any one of aspects 1 to 3, the process comprising:
- (a) withdrawing the first compressed gas of the two or more compressed gases from the one or more compressed gas storage vessels containing the first compressed gas;
- (b) passing the first compressed gas withdrawn in step (a) through the first pressure regulated flow control valve and the first critical flow venturi downstream of the first pressure regulated flow control valve, the first compressed gas passed through the first critical flow venturi under choked flow conditions thereby controlling the mass flow rate of the first compressed gas;
- (c) withdrawing the second compressed gas of the two or more compressed gases from the one or more compressed gas storage vessels containing the second compressed gas;
- (d) passing the second compressed gas withdrawn in step (c) through the second pressure regulated flow control valve and the second critical flow venturi downstream of the second pressure regulated flow control valve, the second compressed gas passed through the second critical flow venturi under choked flow conditions thereby controlling the mass flow rate of the second compressed gas;
- (e) blending the first compressed gas from step (b) with the second compressed gas from step (d) to form the blend; and
- (f) delivering the blend to the receiving vessel without controlling the pressure ramp rate of the blend to the receiving vessel.

Aspect #5. A process for delivering a blend of two or more compressed gases to a receiving vessel, the process comprising:
- (a) withdrawing a first compressed gas of the two or more compressed gases from one or more compressed gas storage vessels containing the first compressed gas;

(b) passing the first compressed gas withdrawn in step (a) through a first pressure regulated flow control valve and a first critical flow venturi downstream of the first pressure regulated flow control valve, the first compressed gas passed through the first critical flow venturi under choked flow conditions thereby controlling the mass flow rate of the first compressed gas;

(c) withdrawing a second compressed gas of the two or more compressed gases from one or more compressed gas storage vessels containing the second compressed gas;

(d) passing the second compressed gas withdrawn in step (c) through a second pressure regulated flow control valve and a second critical flow venturi downstream of the second pressure regulated flow control valve, the second compressed gas passed through the second critical flow venturi under choked flow conditions thereby controlling the mass flow rate of the second compressed gas;

(e) blending the first compressed gas from step (b) with the second compressed gas from step (d) to form the blend; and (f) delivering the blend to the receiving vessel without controlling the pressure ramp rate of the blend to the receiving vessel;

wherein the first compressed gas and the second compressed gas have different compositions.

Aspect #6. The process of aspect #4 or aspect #5 further comprising:

measuring the flow rate of the first compressed gas to obtain a measured flow rate of the first compressed gas;

measuring the flow rate of the second compressed gas to obtain a measured flow rate of the second compressed gas; and adjusting at least one of the first pressure regulated flow control valve and the second pressure regulated flow control valve responsive to the measured flow rate of the first compressed gas and the measured flow rate of the second compressed gas.

Aspect #7. The process of aspect #6 further comprising:

calculating a cumulative blend ratio of the blend based on the measured flow rate of the first compressed gas and the measured flow rate of the second compressed gas; and comparing the calculated cumulative blend ratio of the blend to a target cumulative blend ratio for the blend;

wherein at least one of the first pressure regulated flow control valve and the second pressure regulated flow control valve are adjusted to maintain the calculated cumulative blend flow ratio of the blend within a specified tolerance of the target cumulative blend ratio for the blend.

Aspect #8. The process of any one of aspects #4 to #7 wherein the first compressed gas is withdrawn sequentially from a first compressed gas storage vessel of the one or more compressed gas storage vessels containing the first compressed gas and subsequently from a second compressed gas storage vessel of the one or more compressed gas storage vessels containing the first compressed gas, withdrawal from the first compressed gas storage vessel containing the first compressed gas terminating at a pressure, $P_1$, and withdrawal from the second compressed gas storage vessel containing the first compressed gas initiating at a pressure, $P_2$, wherein $P_2 > P_1$.

Aspect #9. The process of aspect #8 wherein $P_2$ is at least 1 MPa greater than $P_1$.

Aspect #10. The process of any one of aspects #4 to #9 wherein the second compressed gas is withdrawn sequentially from a first compressed gas storage vessel of the one or more compressed gas storage vessels containing the second compressed gas and subsequently from a second compressed gas storage vessel of the one or more compressed gas storage vessels containing the second compressed gas, withdrawal from the first compressed gas storage vessel containing the second compressed gas terminating at a pressure, $P_3$, and withdrawal from the second compressed gas storage vessel containing the second compressed gas initiating at a pressure, $P_4$, wherein $P_4 > P_3$.

Aspect #11. The process of aspect #10 wherein $P_4$ is at least 1 MPa greater than $P_3$.

DETAILED DESCRIPTION

The articles "a" and "an" as used herein mean one or more when applied to any feature in embodiments of the present invention described in the specification and claims. The use of "a" and "an" does not limit the meaning to a single feature unless such a limit is specifically stated. The article "the" preceding singular or plural nouns or noun phrases denotes a particular specified feature or particular specified features and may have a singular or plural connotation depending upon the context in which it is used. The adjective "any" means one, some, or all indiscriminately of whatever quantity. The term "and/or" placed between a first entity and a second entity means one of (1) the first entity, (2) the second entity, and (3) the first entity and the second entity. The term "and/or" placed between the last two entities of a list of 3 or more entities means at least one of the entities in the list.

As used herein, "in fluid flow communication" means operatively connected by one or more conduits, manifolds, valves and the like, for transfer of fluid and/or selective transfer of fluid. A conduit is any pipe, tube, passageway or the like, through which a fluid may be conveyed. An intermediate device, such as a pump, compressor or vessel may be present between a first device in fluid flow communication with a second device unless explicitly stated otherwise.

Downstream and upstream refer to the intended flow direction of the process fluid transferred. If the intended flow direction of the process fluid is from the first device to the second device, the second device is in downstream fluid flow communication of the first device.

The present invention relates to an apparatus and process for delivering a blend of two or more compressed gases to a receiving vessel.

Compressed natural gas (CNG) and hydrogen are typical components dispensed from these compressed gas dispensing systems. These systems are subjected to wide ranges of ambient temperatures which are well above the critical temperatures of hydrogen (−240° C. (−400° F.)) and methane (−83° C. (−117° F.)), so that these components typically are stored and dispensed as supercritical fluids rather than gases according to strict thermodynamic definitions. However, the terms "gas" and "compressed gas" are typically used in the art as generic terms for both gases and supercritical fluids. In the present disclosure, the terms "gas" and "compressed gas" may be used interchangeably and are meant to include elements, compounds, and mixtures in both thermodynamic states of gas and supercritical fluid.

Figure 1:
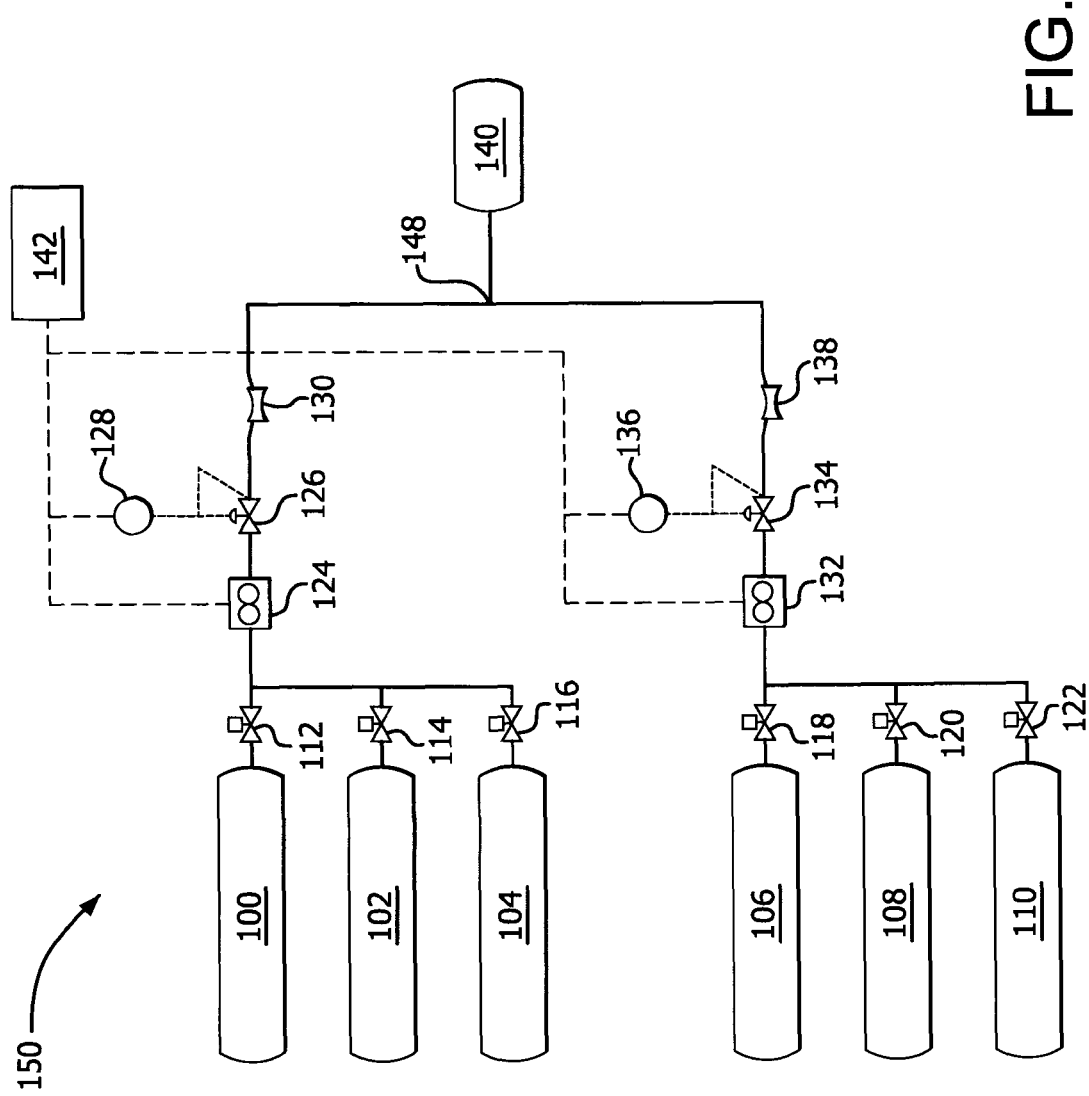
FIG. 1 is a process flow diagram illustrating an exemplary apparatus for delivering a blend of two compressed gases to a receiving vessel.

FIG. 1 illustrates a process flow diagram of an exemplary compressed gas delivery system 150.

The compressed gas delivery system 150 in FIG. 1 includes compressed gas storage vessels 100, 102, and 104 containing a first compressed gas, for example hydrogen or a hydrogen-containing gas. Any suitable number of compressed gas storage vessels may be used. Flow from each of compressed gas storage vessels 100, 102, and 104 is controlled by valves 112, 114, and 116, respectively. The pressure in each of compressed gas storage vessels 100, 102, and 104 may be the same or the pressures may be different. The pressures in each of the compressed gas storage vessels may be maintained at different pressures, for example, for cascade filling.

Cascade filling processes that employ multiple high-pressure storage vessels to dispense to a lower pressure receiving vessel are known in the art, as exemplified in Borck, U.S. Pat. No. 6,779,568. In a cascade filling process, gas is dispensed from two or more compressed gas storage volumes to the receiving vessel, first from a storage vessel having a lower pressure, and then from a storage vessel having a higher pressure.

The use of cascade filling presents a particular problem for generating compressed gas blends of specified composition. Abrupt upstream and downstream pressure changes when the system switches from a lower pressure source vessel to a higher pressure source vessel can adversely affect the ability to provide a compressed gas blend of desired composition within a required specification.

The compressed gas delivery system 150 in FIG. 1 includes pressure regulated flow control valve 126 in downstream fluid flow communication with the compressed gas storage vessels 100, 102, and 104, the flow control valve 126 receiving the first compressed gas from at least one of compressed gas storage vessels 100, 102 and 104. A pressure regulated flow control valve regulates the pressure of the compressed gas downstream of the valve. Any suitable pressure regulated flow control valve may be used. The pressure regulated flow control valve may be a dome loaded pressure regulator, for example, a Tescom 26-1700. The pressure regulated flow control valve may be an air-loaded pressure regulator.

The compressed gas delivery system 150 in FIG. 1 includes critical flow venturi 130 in downstream fluid flow communication with pressure regulated flow control valve 126. Critical flow venturi 130 receives the first compressed gas from pressure regulated flow control valve 126. A critical flow venturi, also called a critical flow venturi tube, or sonic venturi, has a converging section terminating in a throat, and a diverging section downstream of the throat. A critical flow venturi is not equivalent to an orifice plate. The geometry of the critical flow venturi is such that the compressed gas is accelerated along the converging section and then is expanded in a diverging section, which is designed for pressure recovery. In the throat, or minimum area point of the critical flow venturi, the gas becomes choked, where the mass flow rate will not increase with a further decrease in the downstream pressure environment. However, mass flow rate for a compressible fluid can increase with increased upstream pressure, which will increase the density of the fluid through the constriction (though the velocity will remain constant). At choked flow conditions, gas velocity and density are maximized, and the mass flow rate is a function of the inlet pressure, inlet temperature, and the type of gas.

While shown as a single critical flow venturi 130 between valve 126 and mixing junction 148 in FIG. 1, two or more critical flow venturis may be included in a manifold arrangement if desired to accommodate a greater range of flow rates of the first compressed gas.

Suitable critical flow venturis include a FlowMaxx Engineering SNP005-SMPT-025 and SNP005-SMPT-053.

The compressed gas delivery system 150 in FIG. 1 also includes compressed gas storage vessels 106, 108, and 110 containing a second compressed gas, for example compressed natural gas (CNG). The second compressed gas has a different composition than the first compressed gas. Any suitable number of compressed gas storage vessels may be used for containing the second compressed gas. Flow from each of compressed gas storage vessels 106, 108, and 110 is controlled by valves 118, 120, and 122, respectively. The pressure in each of compressed gas storage vessels 106, 108, and 110 may be the same or the pressures may be different. The pressures in each of the compressed gas storage vessels may be maintained at different pressures, for example, for cascade filling.

The compressed gas delivery system 150 in FIG. 1 also includes pressure regulated flow control valve 134 in downstream fluid flow communication with the compressed gas storage vessels 106, 108, and 110. The pressure regulated flow control valve receives the second compressed gas from at least one of compressed gas storage vessels 106, 108, and 110. The pressure regulated flow control valve 134 may be a dome loaded pressure regulator, for example, a Tescom 26-1700.

The compressed gas delivery system 150 in FIG. 1 includes critical flow venturi 138 in downstream fluid flow communication with regulated flow control valve 134. Critical flow venturi 138 receives the second compressed gas from pressure regulated flow control valve 134. While shown as a single critical flow venturi 138 between valve 134 and mixing junction 148 in FIG. 1, two or more critical flow venturis may be included in a manifold arrangement if desired to accommodate a greater range of flow rates of the second compressed gas. Critical flow venturi 138 may be the same as or different than critical flow venturi 130.

The compressed gas delivery system 150 in FIG. 1 also includes a mixing junction 148 in downstream fluid flow communication with critical flow venturi 130 and also in downstream fluid flow communication with critical flow venturi 138 for receiving the first compressed gas and the second compressed gas. The mixing junction 148 may be any suitable mixing Tee, mixing vessel, or the like, for combining the first compressed gas and the second compressed gas to form the blend. When the first compressed gas comprises hydrogen and the second compressed gas comprises compressed natural gas (which comprises methane), the blend comprises a mixture of hydrogen and methane. As shown in FIG. 1, the mixing junction 148 is in upstream fluid flow communication with the receiving vessel 140.

The compressed gas delivery system 150 in FIG. 1 also includes optional flow meter 124. Flow meter 124 is operatively disposed between the compressed gas storage vessels 100, 102, 104 and the receiving vessel 140. The flow meter may be suitably placed at any position in the system operatively connecting the storage vessels and the mixing junction 140 to measure the flow rate of the first compressed gas. Flow meter 124 measures the flow rate of the first compressed gas independent of the flow rate of the second compressed gas.

The compressed gas delivery system 150 in FIG. 1 also includes optional flow meter 132. Flow meter 132 is operatively disposed between the compressed gas storage vessels 106, 108, 110 and the receiving vessel 140. The flow meter may be suitably placed at any position in the system operatively connecting the storage vessels for the second compressed gas and the mixing junction 140 to measure the flow rate of the second compressed gas. Flow meter 124 measures the flow rate of the second compressed gas independent of the flow rate of the first compressed gas.

Flow meters 124 and 132 may be any suitable type of flow meter, for example a Coriolis flow meter and/or hot wire anemometer. The flow meters may also be a volume flow meter such as a turbine meter, which also uses pressure and/or temperature compensation to determine mass flow. Suitable Coriolis flow meters include CMF0010 and DH038 sold by Emerson Process Management (Micro Motion).

As shown in FIG. 1, the compressed gas delivery system 150 may also include controller 142 to automate the compressed gas delivery. Controller 142 can be any suitable controller, for example a programmable logic controller (PLC), computer, or the like. Controller 142 is operatively connected to flow meter 124 and flow meter 132 for receiving signals representing the flow rates of the first and second compressed gas, respectively.

The pressure regulated flow control valves 126 and 134 may be electronically controllable. Current-to-pressure transducers may be used to adjust the pressure regulated flow control valves. Current-to-pressure transducer 128 is operatively connected to pressure regulated flow control valve 126 for adjusting valve 126. Current-to-pressure transducer 136 is operatively connected to pressure regulated flow control valve 134 for adjusting valve 134. Any suitable current-to-pressure transducers may be used, for example, a Ronan X55-600.

Controller 142 is operatively connected to current-to-pressure transducer 128 and current-to-pressure transducer 136 for sending control signals to the current-to-pressure transducers 128 and 136, responsive to flow rate measurements from flow meters 124 and 132.

With reference to FIG. 1 illustrating an exemplary embodiment, the process for delivering the blend of two or more compressed gases to the receiving vessel 140 comprises:
  (a) withdrawing the first compressed gas (e.g. hydrogen) from one or more of compressed gas storage vessels 100, 102, and 104;
  (b) passing the first compressed gas withdrawn in step (a) through pressure regulated flow control valve 126 and critical flow venturi 130 downstream of the regulated flow control valve 126, the first compressed gas passed through critical flow venturi 130 under choked flow conditions thereby controlling the mass flow rate of the first compressed gas;
  (c) withdrawing the second compressed gas (e.g. CNG) from one or more of compressed gas storage vessels 106, 108, 110;
  (d) passing the second compressed gas withdrawn in step (c) through pressure regulated flow control valve 134 and critical flow venturi 138 downstream of pressure regulated flow control valve 134, the second compressed gas passed through critical flow venturi 138 under choked flow conditions thereby controlling the mass flow rate of the second compressed gas;
  (e) blending the mass flow rate-controlled first compressed gas from step (b) with the mass flow rate-controlled second compressed gas from step (d) to form the blend; and
  (f) delivering the blend to the receiving vessel 140 without controlling the pressure ramp rate of the blend to the receiving vessel.

Since the critical flow venturis control the mass flow rate of the compressed gas flowing therethrough, the pressure rise ramp rate of the blend dispensed to the receiving vessel is not controlled.

The process may further comprise:
  measuring the flow rate of the first compressed gas to obtain a measured flow rate of the first compressed gas;
  measuring the flow rate of the second compressed gas to obtain a measured flow rate of the second compressed gas; and
  adjusting at least one of the pressure regulated flow control valve 126 and the pressure regulated flow control valve 134 responsive to the measured flow rate of the first compressed gas and the measured flow rate of the second compressed gas.

The flow rate of the first compressed gas and the flow rate of the second compressed gas may each be measured by respective flow meters 124 and 132. For the case where one of the compressed gases is hydrogen, the critical flow venturi may be part of a flow meter. The flow meters may be in operative communication with a controller. The controller may receive data from the flow meters responsive to the measured mass flow rate and transmit instructions to current-to-pressure transducers 128 and 136. Current-to-pressure transducers 128 and 136, in turn control the pressure regulated flow control valves 126 and 134, respectively to control the flow rate exiting regulated flow control valves 126 and 134.

The process may further comprise:
  calculating a cumulative blend ratio of the blend based on the measured flow rate of the first compressed gas and the measured flow rate of the second compressed gas; and
  comparing the calculated cumulative blend ratio of the blend to a target cumulative blend ratio for the blend;
  wherein at least one of the pressure regulated flow control valve 126 and the pressure regulated flow control valve 134 are adjusted in the step of adjusting at least one of the first pressure regulated flow control valve and the second pressure regulated flow control valve to maintain the calculated cumulative blend ratio of the blend within a specified tolerance of the target cumulative blend ratio for the blend.

The pressure regulated flow control valve 126 and/or pressure regulated flow control valve 134 may be adjusted to increase or decrease the flow rate of the first compressed gas and/or the second compressed gas as required maintain the calculated cumulative blend ratio within a specified tolerance of the target cumulative blend ratio for the blend.

A "blend ratio" is a ratio of a quantity of a first gas to a total quantity of gases. The blend ratio may be a mass ratio, mole ratio, volume ratio, or any other suitable quantity ratio. The molar ratio and volume ratio may be adjusted to standard conditions, such as 1 atmosphere pressure and 21° C., if desired. The blend ratio may be conveniently expressed as a mass ratio. For example a, mass ratio of hydrogen in a blend of hydrogen and compressed natural gas is the mass of hydrogen divided by the total mass of hydrogen and compressed natural gas. The instantaneous mass ratio of hydrogen in a blend of hydrogen and compressed natural gas may be calculated from the measured mass flow rate of hydrogen divided by the sum of the measured mass flow rate of hydrogen and the measured mass flow rate of compressed natural gas.

"Cumulative blend ratio" is defined as the cumulative quantity (in units of mass, moles, volume, etc.) of one compressed gas stream divided by the sum of the cumulative quantities (in the same units) of all compressed gas streams being supplied to a receiving vessel. The cumulative blend ratio may be expressed as a fraction, a percentage or any other convenient unit. The cumulative blend ratio may be conveniently expressed as a cumulative mass ratio.

The "target cumulative blend ratio" is the desired ratio of a quantity (in units of mass, moles, volume, etc.) of one of the compressed gases in the receiving vessel divided by the total quantity (using the same units) of compressed gases in the receiving vessel. The target cumulative blend ratio may be conveniently expressed as a target cumulative mass ratio. The target cumulative blend ratio may be expressed as a fraction, a percentage, or any other convenient unit.

Blend ratios that are expressed as mass ratios can be converted to/from volumetric ratios and/or molar ratios using suitable equations of state for the compressed gases, such calculations being well-known by those of ordinary skill in the art.

The process is particularly suited for dispensing of compressed gases using cascaded withdrawal of compressed gas sequentially from multiple compressed gas storage vessels at progressively increasing pressures.

In the process with cascaded withdrawal, the first compressed gas may be withdrawn sequentially from a first compressed gas storage vessel 100 of the one or more compressed gas storage vessels containing the first compressed gas and subsequently from a second compressed gas storage vessel 102 of the one or more compressed gas storage vessels containing the first compressed gas. Withdrawal from the first compressed gas storage vessel 100 containing the first compressed gas terminates at a pressure, $P_1$, and withdrawal from the second compressed gas storage vessel 102 containing the first compressed gas initiates at a pressure, $P_2$, wherein $P_2 > P_1$. $P_2$ may be at least 1 MPa greater than $P_1$.

For example, the first compressed gas may be withdrawn from compressed gas storage vessel 100 until the pressure in compressed gas storage vessel 100 is $P_1 = 20$ MPa when withdrawal is terminated. Subsequently, the first compressed gas may be withdrawn from compressed gas storage vessel 102, compressed gas storage vessel 102 initially at a pressure of $P_2 = 40$ MPa. Pressure regulated flow control valve 126 adapts to the sudden jump in pressure feeding pressure regulated flow control valve 126 providing compressed gas to the critical flow venturi 130 at the regulated pressure so that the mass flow of compressed gas through the critical flow venturi is as desired.

The process may include cascaded withdrawal of the second compressed gas sequentially from multiple compressed gas storage vessels as progressively increasing pressures.

In the process with cascaded withdrawal of the second compressed gas, the second compressed gas may be withdrawn sequentially from a first compressed gas storage vessel 106 of the one or more compressed gas storage vessels containing the second compressed gas and subsequently from a second compressed gas storage vessel 108 of the one or more compressed gas storage vessels containing the second compressed gas. Withdrawal from the first compressed gas storage vessel 106 containing the second compressed gas terminates at a pressure, $P_3$, and withdrawal from the second compressed gas storage vessel 108 containing the second compressed gas initiates at a pressure, $P_4$, wherein $P_4 > P_3$. $P_4$ may be at least 1 MPa greater than $P_3$.

For example, the second compressed gas may be withdrawn from compressed gas storage vessel 106 until the pressure in compressed gas storage vessel 100 is $P_3 = 20$ MPa when withdrawal is terminated. Subsequently, the second compressed gas may be withdrawn from compressed gas storage vessel 108, compressed gas storage vessel 108 initially at a pressure of $P_4 = 40$ MPa. Pressure regulated flow control valve 134 adapts to the sudden jump in pressure feeding pressure regulated flow control valve 134 providing compressed gas to the critical flow venturi 138 at the regulated pressure so that the mass flow of the second compressed gas through the critical flow venturi is as desired.

EXAMPLE 1

A compressed gas delivery system comprising pressure regulated flow control valves and critical flow venturis to separately control the flow of hydrogen and compressed natural gas was tested.

Figure 2:
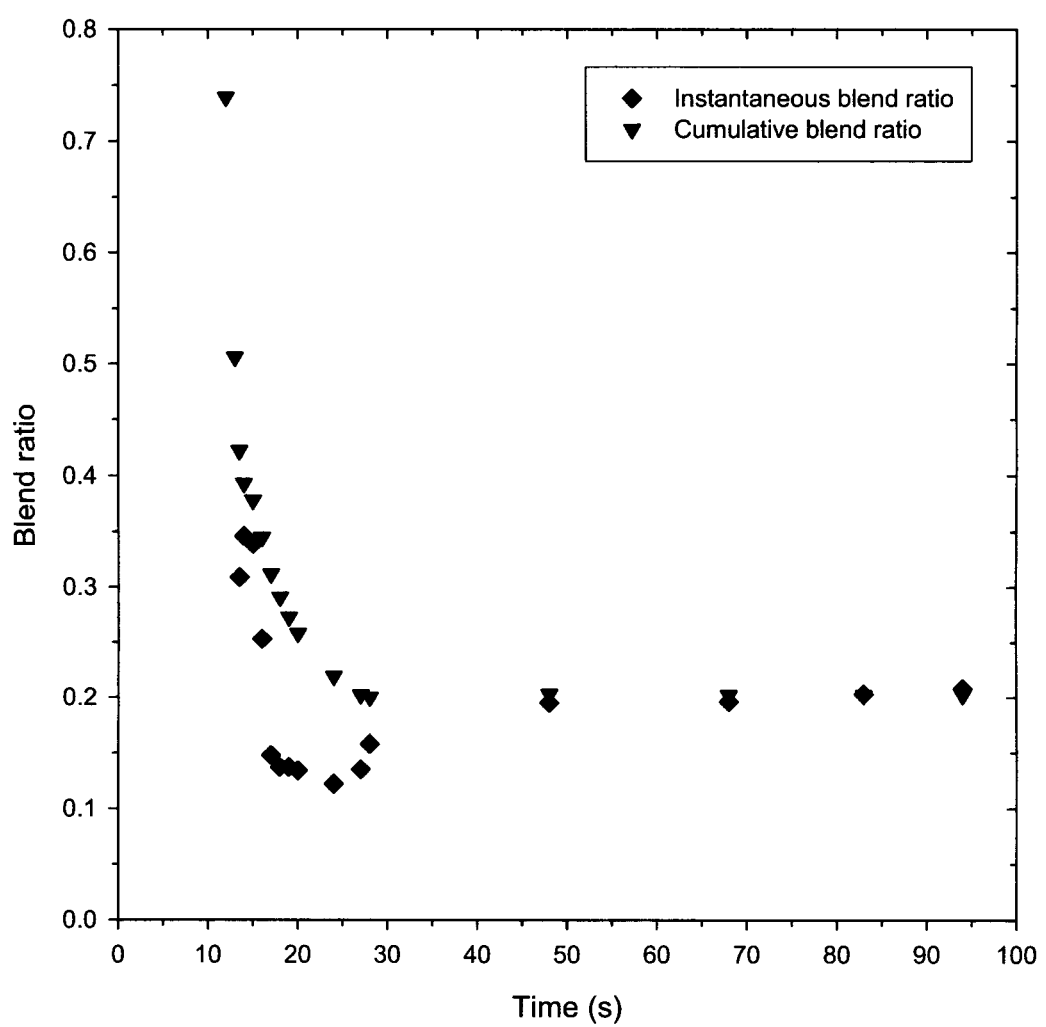
FIG. 2 shows a plot of instantaneous blend ratio of hydrogen as a function of time and cumulative blend ratio of hydrogen as a function of time using the process and apparatus according to the present invention.

FIG. 2 shows a plot of instantaneous blend ratio of hydrogen as a function of time and cumulative blend ratio of hydrogen as a function of time. The target blend ratio was 0.20 hydrogen, (20% hydrogen by volume at standard pressure and temperature conditions).

Initially the cumulative blend ratio of hydrogen was greater than the target blend ratio of hydrogen and the instantaneous blend ratio of hydrogen was decreased below 0.2 by the controller during the period from about 15 seconds to about 30 seconds where the instantaneous blend ratio of hydrogen leveled out at about 0.2.

This example shows how the compressed gas delivery system according to the present apparatus and method can provide accurate blending of compressed gases, the blends having specified compositions.

EXAMPLE 2

A compressed gas delivery system was tested where the compressed gas delivery system comprised a pressure regulated flow control valve to control the flow of hydrogen and another pressure regulated flow control valve to control the flow of compressed natural gas without any critical flow venturis.

Figure 3:
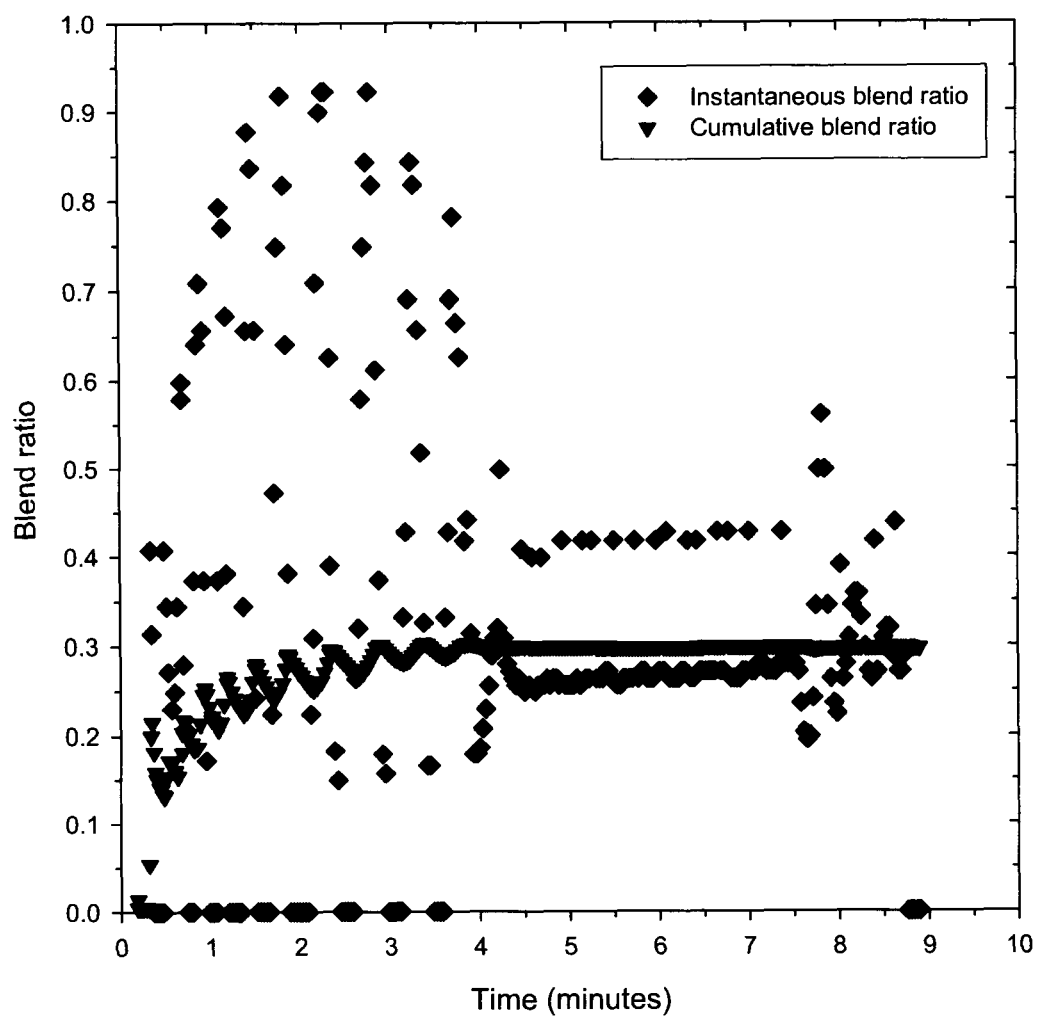
FIG. 3 shows a plot of instantaneous blend ratio of hydrogen as a function of time and cumulative blend ratio of hydrogen as a function of time not using the process and apparatus according to the present invention.

FIG. 3 shows a plot of instantaneous blend ratio of hydrogen as a function of time and cumulative blend ratio of hydrogen as a function of time. The target blend ratio was 0.30 (30% hydrogen by volume at standard pressure and temperature conditions).

While the cumulative blend ratio eventually settles on the desired target blend ratio, the controller is frequently adjusting the pressure regulated control flow control valves to achieve the target as evidenced by the frequent changes of the instantaneous blend ratio. The system is clearly not as stable as the system shown in Example 1. Note that if the fueling operator had stopped the fueling process before the cumulative blend ratio stabilized, the receiving vessel would not have contained the desired blend ratio. Further, since the flowing gas ratio is not about the same as the target blend ratio, the blend ratio of the compressed gas in the line at the end of the fill and used to determine the pressure in the tank in the subsequent fill will not be of the desired target blend ratio, leading to off-specification blends when filling small containers. Still further, the constant "hunting" by the controller shown in FIG. 3, will lead to premature wear failure of the control valve mechanisms.

The results shown in FIG. 2, illustrate that the present method provides a cumulative blend ratio that reaches the target blend ratio much sooner.

Although the present invention has been described as to specific embodiments or examples, it is not limited thereto, but may be changed or modified into any of various other forms without departing from the scope of the invention as defined in the accompanying claims.

I claim:

1. An apparatus for delivering a blend of two or more compressed gases to a receiving vessel, the apparatus comprising:
   one or more compressed as storage vessels containing a first compressed gas;
   a first pressure regulated flow control valve in downstream fluid flow communication with the one or more compressed gas storage vessels containing the first compressed gas;
   a first critical flow venturi in downstream fluid flow communication with the first pressure regulated flow control valve;
   one or more compressed as storage vessels containing a second compressed gas;
   a second pressure regulated flow control valve in downstream fluid flow communication with the one or more compressed gas storage vessels containing the second compressed gas;
   a second critical flow venturi in downstream fluid flow communication with the second pressure regulated flow control valve; and
   a mixing junction in downstream fluid flow communication with the first critical flow venturi and also in downstream fluid flow communication with the second critical flow venturi for receiving the first compressed gas and the second compressed gas, the mixing junction in upstream fluid flow communication with the receiving vessel;
   a first flow meter operatively disposed between the one or more compressed as storage vessels containing the first compressed gas and the receiving vessel for measuring the flow rate of the first compressed as independent of the flow rate of the second compressed gas; and
   a second flow meter operatively disposed between the one or more compressed gas storage vessels containing the second compressed gas and the receiving vessel for measuring the flow rate of the second compressed gas independent of the flow rate of the first compressed gas;
   a first current-to-pressure transducer operatively connected to the first pressure regulated flow control valve for adjusting the first pressure regulated flow control valve;
   a second current-to-pressure transducer operatively connected to the second pressure regulated flow control valve for adjusting the second pressure regulated flow control valve; and
   a controller operatively connected to the first flow meter for receiving a signal representing the flow rate of the first compressed gas, the controller operatively connected to the second flow meter for receiving another signal representing the flow rate of the second compressed gas, the controller operatively connected to the first current-to-pressure transducer and the second current-to-pressure transducer for sending control signals to the first current-to-pressure transducer and the second current-to-pressure transducer;
   wherein the first compressed gas and the second compressed as have different compositions.

2. A process for delivering the blend of two or more compressed eases to the receiving vessel using the apparatus of claim 1, the process comprising:
   (a) withdrawing the first compressed gas of the two or more compressed gases from the one or more compressed gas storage vessels containing the first compressed gas;
   (b) Passing the first compressed gas withdrawn in step (a) through the first pressure regulated flow control valve and the first critical flow venturi downstream of the first pressure regulated flow control valve, the first compressed gas passed through the first critical flow venturi under choked flow conditions thereby controlling the mass flow rate of the first compressed gas;
   (c) withdrawing the second compressed gas of the two or more compressed gases from the one or more compressed gas storage vessels containing the second compressed gas;
   (d) passing the second compressed gas withdrawn in step (c) through the second pressure regulated flow control valve and the second critical flow venturi downstream of the second pressure regulated flow control valve the second compressed gas passed through the second critical flow venturi under choked flow conditions thereby controlling the mass flow rate of the second compressed gas;
   (e) blending the first compressed gas from step (b) with the second compressed gas from step (d) to form the blend; and
   (f) delivering the blend to the receiving vessel without controlling the pressure ramp rate of the blend to the receiving vessel;
   wherein the flow rate of the first compressed gas is measured to obtain a measured flow rate of the first compressed gas;
   wherein the flow rate of the second compressed gas is measured to obtain a measured flow rate of the second compressed gas;
   wherein at least one of the first pressure regulated flow control valve and the second pressure regulated flow control valve is adjusted responsive to the measured flow rate of the first compressed gas and the measured flow rate of the second compressed gas;
   wherein a cumulative blend ratio of the blend based on the measured flow rate of the first compressed gas and the measured flow rate of the second compressed gas is calculated;
   wherein the calculated cumulative blend ratio of the blend is compared to a target cumulative blend ratio for the blend; and
   wherein at least one of the first pressure regulated flow control valve and the second pressure regulated flow control valve are adjusted to maintain the calculated cumulative blend ratio of the blend within a specified tolerance of the target cumulative blend ratio for the blend.

3. The process of claim 2 wherein the first compressed gas is withdrawn sequentially from a first compressed gas storage vessel of the one or more compressed gas storage vessels containing the first compressed gas and subsequently from a second compressed gas storage vessel of the one or more compressed gas storage vessels containing the first compressed gas, withdrawal from the first compressed gas storage vessel containing the first compressed gas terminating at a pressure, $P_1$, and withdrawal from the second compressed gas storage vessel containing the first compressed gas initiating at a pressure, $P_2$, wherein $P_2 > P_1$.

4. The process of claim 2 wherein the second compressed gas is withdrawn sequentially from a first compressed gas storage vessel of the one or more compressed gas storage vessels containing the second compressed gas and subsequently from a second compressed gas storage vessel of the one or more compressed gas storage vessels containing the second compressed gas, withdrawal from the first compressed gas storage vessel containing the second compressed gas terminating at a pressure, $P_3$, and withdrawal from the second compressed gas storage vessel containing the second compressed gas initiating at a pressure, $P_4$, wherein $P_4 > P_3$.

5. A process for delivering a blend of two or more compressed gases to a receiving vessel, the process comprising:
   (a) withdrawing a first compressed gas of the two or more compressed gases from one or more compressed gas storage vessels containing the first compressed gas;
   (b) passing the first compressed gas withdrawn in step (a) through a first pressure regulated flow control valve and a first critical flow venturi downstream of the first pressure regulated flow control valve, the first compressed gas passed through the first critical flow venturi under choked flow conditions thereby controlling the mass flow rate of the first compressed gas;
   (c) withdrawing a second compressed gas of the two or more compressed gases from one or more compressed gas storage vessels containing the second compressed gas wherein the second compressed gas has a different composition than the first compressed gas;
   (d) passing the second compressed gas withdrawn in step (c) through a second pressure regulated flow control valve and a second critical flow venturi downstream of the second pressure regulated flow control valve, the second compressed gas passed through the second critical flow venturi under choked flow conditions thereby controlling the mass flow rate of the second compressed gas;
   (e) blending the first compressed gas from step (b) with the second compressed gas from step (d) to form the blend;
   (f) delivering the blend to the receiving vessel without controlling the pressure ramp rate of the blend to the receiving vessel;
   wherein the mass flow rate of the first compressed gas is measured to obtain a measured mass flow rate of the first compressed gas;
   wherein the mass flow rate of the second compressed gas is measured to obtain a measured mass flow rate of the second compressed gas;
   wherein at least one of the first pressure regulated flow control valve and the second pressure regulated flow control valve is adjusted responsive to the measured mass flow rate of the first compressed gas and the measured mass flow rate of the second compressed gas;
   wherein a cumulative blend ratio of the blend based on the measured flow rate of the first compressed gas and the measured flow rate of the second compressed gas is calculated;
   wherein the calculated cumulative blend ratio of the blend is compared to a target cumulative blend ratio for the blend; and
   wherein at least one of the first pressure regulated flow control valve and the second pressure regulated flow control valve are adjusted to maintain the calculated cumulative blend ratio of the blend within a specified tolerance of the target cumulative blend ratio for the blend.

6. The process of claim 5 wherein the first compressed gas is withdrawn sequentially from a first compressed gas storage vessel of the one or more compressed gas storage vessels containing the first compressed gas and subsequently from a second compressed gas storage vessel of the one or more compressed gas storage vessels containing the first compressed gas, withdrawal from the first compressed gas storage vessel containing the first compressed gas terminating at a pressure, $P_1$ and withdrawal from the second compressed gas storage vessel containing the first compressed gas initiating at a pressure, $P_2$, wherein $P_2 > P_1$.

7. The process of claim 5 wherein the second compressed gas is withdrawn sequentially from a first compressed gas storage vessel of the one or more compressed gas storage vessels containing the second compressed gas and subsequently from a second compressed gas storage vessel of the one or more compressed gas storage vessels containing the second compressed gas, withdrawal from the first compressed gas storage vessel containing the second compressed gas terminating at a pressure, $P_3$, and withdrawal from the second compressed gas storage vessel containing the second compressed gas initiating at a pressure, $P_4$, wherein $P_4 > P_3$.

* * * * *

UNITED STATES PATENT AND TRADEMARK OFFICE
CERTIFICATE OF CORRECTION

PATENT NO. : 8,418,732 B2
APPLICATION NO. : 13/177030
DATED : April 16, 2013
INVENTOR(S) : Joseph Perry Cohen It is certified that error appears in the above-identified patent and that said Letters Patent is hereby corrected as shown below:

In the Claims:

Col. 11, In Claim 1, line 13, delete the word "as" and insert the word --gas--.

Col. 11, In Claim 1, line 22, delete the word "as" and insert the word --gas--.

Col. 11, In Claim 1, line 39, delete the word "as" and insert the word --gas--.

Col. 11, In Claim 1, line 41, delete the word "as" and insert the word --gas--.

Col. 11, In Claim 1, line 67, delete the word "as" and insert the word --gas--.

Col. 12, In Claim 2, line 2, delete the word "eases" and insert the word --gases--.

Col. 12, In Claim 2, line 7, delete the word "Passing" and insert the word --passing--.

Signed and Sealed this
Twenty-first Day of May, 2013

Teresa Stanek Rea
*Acting Director of the United States Patent and Trademark Office*